United States Patent
Quintero

(10) Patent No.: US 6,267,716 B1
(45) Date of Patent: Jul. 31, 2001

(54) LOW SHEAR TREATMENT FOR THE REMOVAL OF FREE HYDROCARBONS, INCLUDING BITUMEN, FROM CUTTINGS

(75) Inventor: Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/425,753

(22) Filed: Oct. 22, 1999

Related U.S. Application Data

(60) Provisional application No. 60/105,502, filed on Oct. 23, 1998.

(51) Int. Cl.$^7$ .................................................. B09B 3/00
(52) U.S. Cl. ........................... 588/252; 175/66; 588/259
(58) Field of Search .................... 175/66, 206; 405/128; 516/39; 588/249, 252, 259

(56) References Cited

U.S. PATENT DOCUMENTS

| | | | |
|---|---|---|---|
| Re. 33,747 | * 11/1991 | Hartley et al. .................. 405/128 X |
| 3,210,310 | 10/1965 | Holbert et al. . | |
| 4,040,866 | 8/1977 | Mondshine ............................. 134/26 |
| 4,209,381 | 6/1980 | Kelly, Jr. . | |
| 4,395,357 | 7/1983 | Kramer et al. ....................... 252/428 |
| 4,425,241 | 1/1984 | Swanson . | |
| 4,469,603 | 9/1984 | Lepain et al. ........................ 210/749 |
| 4,554,081 | 11/1985 | Borchardt et al. . | |
| 4,597,893 | 7/1986 | Byford et al. ....................... 252/354 |
| 4,599,117 | 7/1986 | Luxemburg ........................ 134/25.1 |
| 4,600,515 | 7/1986 | Gleason et al. . | |
| 4,645,608 | 2/1987 | Rayborn . | |
| 4,649,183 | 3/1987 | McCormick et al. ............... 526/240 |
| 4,762,276 | * 8/1988 | Foust ................................. 405/128 X |
| 4,812,242 | 3/1989 | James et al. ......................... 210/735 |
| 4,861,499 | 8/1989 | Neff et al. . | |
| 4,892,916 | 1/1990 | Hawe et al. ......................... 526/304 |
| 4,913,585 | * 4/1990 | Thompson et al. .................. 405/128 |
| 5,005,655 | 4/1991 | Stokke et al. .......................... 175/66 |
| 5,076,938 | 12/1991 | Noonan et al. ...................... 210/708 |
| 5,156,686 | 10/1992 | Van Slyke ............................. 134/26 |
| 5,195,847 | * 3/1993 | Guymon ............................ 175/66 X |
| 5,213,625 | 5/1993 | Van Slyke ............................. 134/26 |
| 5,277,519 | * 1/1994 | Nahm ............................... 588/252 X |
| 5,402,857 | 4/1995 | Dietzen ................................. 175/66 |
| 5,405,223 | * 4/1995 | Sirevag ............................. 175/66 X |
| 5,430,237 | * 7/1995 | Sharp ................................... 588/252 |
| 5,564,509 | 10/1996 | Dietzen ................................. 176/66 |
| 5,570,749 | 11/1996 | Reed ..................................... 175/66 |
| 5,589,603 | * 12/1996 | Alexander et al. ................ 175/66 X |
| 5,622,920 | 4/1997 | Rivas et al. .......................... 507/232 |
| 5,792,223 | 8/1998 | Rivas et al. ............................ 44/302 |
| 5,839,521 | 11/1998 | Dietzen ................................. 175/66 |
| 5,882,524 | 3/1999 | Storey et al. ........................ 210/712 |

FOREIGN PATENT DOCUMENTS 0 554 377 A1   6/1993   (EP) .
0 728 826 A1   8/1996   (EP) .

\* cited by examiner

*Primary Examiner*—George Suchfield
(74) *Attorney, Agent, or Firm*—Paula D. Morris & Associates

(57) ABSTRACT

A method for selecting an emulsifier for isolating free hydrocarbons in a given drilling system and a method of using the emulsifiers to treat drill cuttings to isolate free hydrocarbons, including bitumen.

27 Claims, No Drawings

LOW SHEAR TREATMENT FOR THE REMOVAL OF FREE HYDROCARBONS, INCLUDING BITUMEN, FROM CUTTINGS

This application claims the benefit of applicant Ser. No. 60/105,502, filed Oct. 23, 1998.

FIELD OF THE INVENTION

The present invention relates to a method for in situ treatment of drill cuttings to remove free hydrocarbons, including heavy crude oil and/or bitumen from the cuttings.

BACKGROUND OF THE INVENTION

During the drilling of oil and/or gas wells, a drill bit at the end of a rotating drill string, or at the end of a drill motor, is used to penetrate through geologic formations. During this operation, drilling mud is circulated through the drill string, out of the bit, and returned to the surface via the annular space between the drill pipe and the formation. Among other functions, the drilling mud provides a washing action to remove the formation cuttings from the wellbore. The mud returns to the surface along with entrained drill cuttings and typically flows through "shale shakers," desanders, desilters, hydrocyclones, centrifuges, and/or other known devices to separate the cuttings from the mud. The shale shaker(s), which typically sit above the mud storage area, essentially are screens that are used to separate the drill cuttings from the drilling mud. The drilling mud falls through the screens by gravity and the cuttings pass over the end of the screens.

The disposal of the drill cuttings after separation from the drilling mud can present a problem. One way to dispose of the cuttings would be to discharge the cuttings directly at the drilling site. An even more economically efficient way to dispose of drill cuttings would be to "recycle" the cuttings as components of building materials, such as concrete. Unfortunately, the cuttings may contain environmentally undesirable "free hydrocarbons," defined herein as hydrocarbons derived either from the drilling mud, from the rock formation, or both.

One approach that has been used to reduce potential environmental contamination by drill cuttings has been to minimize the toxicity of the oil-base fluids used to make drilling muds, and more recently, to use base fluids that are more biodegradable. Unfortunately, this approach does not eliminate contamination by the free hydrocarbons which originate in the rock formation rather than in the drilling fluid.

Methods are needed to treat cuttings, preferably in situ, to reduce the quantity of free hydrocarbons discharged into the environment upon subsequent use or disposal of the cuttings.

SUMMARY OF THE INVENTION

The invention provides a method comprising: providing cuttings produced during drilling operations comprising a first quantity of free hydrocarbons comprising bitumen; mixing with the cuttings a buffer solution comprising a buffer agent effective to activate at least one natural surfactant in the bitumen, thereby converting the solution into an emulsion comprising bitumen droplets having a mean average particle size of about 5 microns or less; mixing with the emulsion an emulsifier effective to stabilize the emulsion; and, thereafter adding to the emulsion an encapsulating material comprising an aqueous solution of a water soluble silicate under conditions effective to form silica shells around the droplets.

DETAILED DESCRIPTION OF THE INVENTION

According to the present invention, drill cuttings are treated, preferably in situ, to minimize their environmental impact upon subsequent use or disposal. The free hydrocarbons in the cuttings preferably are converted into "isolated hydrocarbons," preferably using emulsification and encapsulation techniques. The converted cuttings comprising the isolated hydrocarbons may be disposed of in a variety of ways. In a preferred embodiment, the converted cuttings either are discharged into the environment, preferably at the drilling site in order to reduce costs, or the converted cuttings are reused to make concrete.

The conversion to "isolated hydrocarbons" reduces the hydrocarbon content in the cuttings, as determined using standard techniques, such as liquid/liquid extraction or solid-phase extraction followed by gas chromatography or QFT fluorescence. Preferably, the free hydrocarbons are reduced to at least about 1 wt. % or less, preferably at least about 0.1 wt. % or less.

Isolated hydrocarbons may be formed in a number of ways, including but not necessarily limited to a preferred method in which free hydrocarbons are encapsulated with an encapsulating material which renders the hydrocarbons wholly or partially inaccessible for a prolonged period of time. In a most preferred embodiment, the free hydrocarbons in the drilling mud are non-toxic and biodegradable.

The cuttings may be treated using any suitable system of equipment. After separation from the drilling mud, the contaminated cuttings typically pass through a holding bin into an inlet hopper. The cuttings preferably are treated directly in a batch mixer equipped with an appropriate inlet for the relevant solutions, and an apparatus for low shear mixing, such as a paddle mixer.

The preferred conditions for forming isolated hydrocarbons will vary depending upon the upon the types of free hydrocarbons in the cuttings. Many types of hydrocarbons may be converted into isolated hydrocarbons in a first preferred embodiment, in which the cuttings are sprayed with an emulsifying solution effective to transform the free hydrocarbons in the cuttings into an oil-in-water emulsion with very low droplet size. The emulsion thereafter is treated with an encapsulating material to encapsulate the emulsified hydrocarbons.

The composition of the emulsifying solution will vary depending upon the type of free hydrocarbons found in the drilling mud and/or in the cuttings, and may be similar to the emulsifiers used in U.S. Pat. No. 5,076,938, incorporated herein by reference. However, the following emulsifiers are superior because of (a) environmental compatibility, and (b) stability of the emulsion. The emulsifying solution may be a blend of organic acids, inorganic acids, and emulsifiers. Preferred emulsifying solutions are as non-toxic as possible, and the components of the emulsifying solution have an ionic nature selected from the group consisting of cationic, anionic, non-ionic, and combinations thereof. In a preferred embodiment, the emulsifying solution comprises at least a non-ionic surfactant and most preferably a combination of a non-ionic and an anionic emulsifier. Although compounds called "emulsifiers" herein typically are referred to as surfactants, their function in the present solution is to act as emulsifiers. The emulsifying solution lowers the interfacial tension between the oil and water to produce a droplet size—or an average mean diameter of the oil droplets in the continuous water phase—which is sufficiently small to form a stable emulsion but sufficiently large to generate a total surface area that can be encapsulated using an acceptably low concentration of chemical additives. Preferably, the droplets have a mean average diameter of from about 1 micron to about 20 microns, preferably about 15 microns or less, more preferably about 10 microns or less, even more preferably about 5 microns or less, and most preferably about 2 microns or less.

Because the operator will know the composition of the oil in the rock formation to be drilled, whether bitumen will be encountered, and also the composition of the base oil in the drilling system to be used, emulsifier selection initially is based on the properties of the oil to be encountered, such as its hydrophobicity. Candidate emulsifiers initially may be chosen based on their hydrophilic/lipophilic balance. Preferably, the HLB of the emulsifier or the emulsifier combination is substantially the same as the required HLB for oil-in-water emulsification with the oil to be encountered. "HLB of Nonionic Surfactants," *Nonionic Surfactants Physical Chemistry*. Schick Martin J., ed., Surfactant Series V. 23 (Marcell Dekker, Inc. 1987; "Recent Progress on HLB System in Organized Solutions," *Organized Solutions, Surfactants in Science and Technology*, Friberg, S. and B. Lindman, ed., Surfactant Series V. 44 (Marcel Dekker, Inc. 1992), both incorporated herein by reference. Emulsifier selection also is determined by whether or not bitumen will be present in the drill cuttings, as discussed more fully below.

In order to determine the best emulsifier or emulsifier combination to use with a given drilling system, the drilling fluid is mixed with the emulsifier solution in a proportion of from about 70/30 to about 30/70. The concentration of the emulsifier used is less than 1.5% (wt/wt) in the final emulsion. The mixture is agitated using a mixer such as a Prince-Castle mixer at about 800 to about 1300 rpm for about 1 to 10 minutes. The average oil emulsion droplet size is measured by Low Angle Laser Light Scattering as a function of mixing time using a Mastersizer, available from Malvern Instruments, according to the procedures in the Malvern Mastersizer Basic Manual 0103. See also Rawle, A. *The Basic Principles of Particle Size Analysis*, p.7–8; a published paper which is available from Malvern Instruments Rawle, A. *The Importance of Particle Size Analysis in Emulsions*, presented at the 10th International Symposium on Surfactants in Solution (1994); and, Stanley-Wood, G. and Allen, T. *Particle Size Analysis* (Wiley Heyden Ltd. 1981), all of which are incorporated herein by reference.

Preferred emulsifiers for a given system are those that produce the smallest average droplet size and which produce emulsions that exhibit the least volume decrease over time, hereinafter referred to as those emulsions having an "initial volume that is substantially the same as the final volume." The average droplet size is measured after formation of an emulsion, which typically takes from about 3 to about 5 minutes of mixing time, when no significant change in droplet size is observed. The average droplet size of suitable emulsifier candidates is about 20 microns or less, preferably about 15 microns or less. After about 10 minutes of mixing, the emulsion sample is placed in a 100 ml graduated cylinder where the reduction in emulsion volume is measured as a function of time over a period of time sufficient to assess the stability of the emulsion, typically about 8 weeks. Reductions in emulsion volume are due to (1) a increase of free oil by coalescence of oil droplets, and/or (2) an increase of water due to creaming of the emulsion.

In one embodiment of the invention, the free hydrocarbons do not include "extra heavy crude oil"—hereinafter referred to as "bitumen," which generally originates in the formation being drilled. As used herein, the term "bitumen" or "extra heavy crude oil" is defined as oil having an API gravity of about 10 or less, preferably less than 10. In this embodiment, preferred emulsifying solutions comprise phosphoric acid, or another acidic composition with similarly low toxicity, and water. The phosphoric acid comprises from about 15 wt. % to about 45 wt. %, preferably about 20 wt. % of the solution, and the water comprises from about 5 wt. % to about 90 wt. %, preferably from about 50 wt. % to about 65 wt. % of the solution. In order to achieve the desired small droplet size in this embodiment, it is necessary to use emulsifiers with the correct hydrophilic/lipophilic balance (HLB). The required HLB differs depending on the oil emulsified.

Where bitumen contamination is not present, the required HLB is achieved using a non-ionic, anionic, or nonionic-anionic blend emulsifier. Preferred non-ionic emulsifiers for this embodiment include, but are not necessarily limited to polyoxyethylene alcohols (or ethoxylated alcohols) comprising from about 8 to about 30, preferably from about 8 to about 20 carbon atoms, and comprising from about 3 to about 50 moles, most preferably from about 3 to about 20 moles of ethylene oxide. The following are preferred HLB's for non-ionic emulsifiers when the drilling mud contains the following oils: olefins and paraffins-HLB 12.5; esters-HLB-15.4; synthetic iso-paraffins-HLB 10.9.

Blends of both non-ionic and anionic emulsifiers have been found to decrease droplet size in most instances. Where such a blend is used, a preferred ratio of non-ionic to anionic emulsifier is about 5/95 to about 95/5, preferably about 70/30 to about 95/5. Any suitable, non-toxic anionic emulsifier may be used in such blends. Preferred anionic emulsifiers include, but are not necessarily limited to those selected from the group consisting of: alkane sulfates and alkane sulfonates comprising from about 8 to about 18 carbon atoms, preferably from about 8 to about 12 carbon atoms.

The following are preferred emulsifying solutions for use with the specified type of drilling muds when bitumen is not present. The drilling muds indicated by brand name are available from Baker Hughes INTEQ, and the brand name represents a proprietary trademark of Baker Hughes INTEQ):

For use with a drilling mud comprising isomerized olefins (SYN-TEQ[7]) (blend of emulsifiers);

| | |
|---|---|
| Secondary alkanesulfonate of sodium, or Sodium octyl sulfate | 9.75 wt % |
| Isodecyl alcohol ethoxylate with 6 moles of ethylene oxide | 55.25 wt % |
| Water + phosphoric acid | 35 wt % |

Ratio of (Isodecyl alcohol ethoxylate with 6 moles of EO) to (secondary alkanesulfonate of sodium or Sodium Octyl Sulfate)=85:15
Ratio of active emulsifier to phosphoric acid=3:23
Ratio of (Isodecyl alcohol ethoxylate with 6 moles of EO/secondary alkanesulfonate of sodium or sodium octyl sulfate)=85/15

For use with an ester-containing drilling mud (blend of emulsifiers)

| | |
|---|---|
| Sodium Octyl Sulfate | 6.50 wt % |
| Oleyl alcohol ethoxylate with 20 moles of ethylene oxide | 58.50 wt % |
| Water + phosphoric acid | 35 wt % |

Ratio of(Oleyl alcohol ethoxylate with 20 moles of EO)/ Sodium octyl sulfate=90/10
For use with a paraffin-containing mud (PARA-TEQ[7]):

| | |
|---|---|
| Isotridecyl alcohol ethoxylate with 7 moles of ethylene oxide | 55.25 wt % |
| Secondary alkanesulfonate of sodium or sodium octyl sulfate | 9.75 |
| Water + phosphoric acid | 35 wt % |

An excess of the emulsifier solution is added to the cuttings, preferably in the inlet hopper. The amount of emulsifier added will depend upon the concentration of free hydrocarbons in the cuttings, as measured by any suitable means, such as "retort," or distillation and measurement of the oil content. After adding the emulsifying solution, the wt/wt ratio of emulsifier in the cuttings should be about 0.2 wt. % to about 5 wt. % for cuttings contaminated with about 2 wt. % free hydrocarbons to about 18 wt. % free hydrocarbons, respectively. The oil/water ratio in the cuttings should be from about 40/60 to about 15/85, preferably from about 50/50 to about 20/80. The cuttings and emulsifying solution may be agitated so that substantially all of the free hydrocarbons are removed from the cuttings and emulsified or dispersed in the emulsifier solution. Thereafter, the encapsulating material is added.

The encapsulating material may be substantially any encapsulating material that preferably reacted with the acid material and surrounds the emulsified hydrocarbon droplets and solidifies. Suitable encapsulating materials include, but are not necessarily limited to silicates and polymeric microencapsulating materials. A preferred encapsulating material is a silicate solution.

A preferred silicate solution has the following composition:

| | |
|---|---|
| Potassium or Sodium Silicate | 33–58 wt % |
| Waterglass solution | 0.01 to 2.0 wt % |
| Aluminum Trihydrate | 0.01 to 2.0 wt % |
| Titanium | 0.01 to 2.0 wt % |
| Water | Balance |

The amount of silicate solution that is added to the emulsified solution preferably is about 1 to about 2 times the amount of emulsifying solution added.

The emulsifier rapidly and substantially completely emulsifies the free hydrocarbons in the cuttings into small droplets. In this embodiment, application of the silicate solution to the acidic emulsified oil traps the emulsified oil in silica shells. The cutting/oil encapsulated mixture can be allowed to dry and then the cuttings/capsules together can be disposed of or recycled for another use, for example, in concrete.

In a preferred embodiment, the cuttings contain "bitumen" or "extra heavy crude oil" from the formation. In this embodiment, the additive sequence must be changed somewhat in order to convert the bitumen into isolated hydrocarbons. The following Table contains the typical composition and API gravity of bitumen:

| | Bitumen |
|---|---|
| API gravity (60/60 F) | 8–8.5 |
| Aromatics % | 45–47 |
| Saturated hydrocarbons % | 11–13 |
| Resins % | 30–32 |
| Asphaltenes % | 11–13 |
| Acid number, mg KOH/g | 3–4 |

Although the typical API gravity for bitumen is about 10 or less, the procedure described herein is useful for conversion of hydrocarbons having even higher API gravities, which may reach as high as about 20.

Although bitumen is a highly viscous, semisolid liquid at ambient temperatures (i.e., less than about 45° C.), bitumen essentially behaves like a solid with strong adherence to the cuttings. As a result, bitumen is very difficult to emulsify and remove from the cuttings. In order to remove bitumen from the cuttings and emulsify the bitumen using only commercial emulsifiers, even those having good detergency, high shear mixing would be necessary. High shear mixing cannot be accomplished economically in situ.

In order to emulsify bitumen to form encapsulated droplets using low shear mixing—which can be performed economically in situ—the following procedures are followed:

(a) the cuttings are premixed with a buffer solution to activate known natural surfactants in the bitumen, the mixing being continued for from about 0.5 to about 5 minutes, preferably for about 2 minutes;

(b) an emulsifier (discussed below) is added and mixing is continued for about 0.5 to about 5 minutes, preferably for about 1.0 minutes (a total mixing time of about 3 minutes) to produce emulsion droplets having a diameter of about 10 microns or less, preferably about 5 microns or less, most preferably about 2 microns or less;

(c) the encapsulating material (preferably reactive sodium silicate) is added to the resulting solution, as described above, and mixed for about 0.5 to about 3 minutes, preferably for about 1 minute; and (d) a non-toxic acid, such as phosphoric acid, is added to the solution and mixed for about 0.5 to about 3 minutes, preferably for about 1.5 minutes, to react with the reactive sodium silicate and to form silica "shells" around the emulsified oil droplets.

The inactive natural surfactants contained in the bitumen includes carboxylic acids, phenols, esters, and mixtures thereof The inactive natural surfactants preferably are activated by mixing with an aqueous solution containing a suitable buffer additive. Suitable buffer additives form a basic aqueous buffer solution adapted to extract and activate the inactive natural surfactants, thereby stabilizing the emulsion. Examples of suitable buffer additives include, but are not necessarily limited to, alkali metal salts, water soluble amines, such as diethylamine, triethylamine, dipropylamine, tetramethylammonium hydroxide, tetrapropylammonium hydroxide, and mixtures thereof, preferably in combination with an alkali additive, such as an alkali metal salt, an alkaline earth metal salt, and a combination thereof, such as sodium chloride, potassium chloride, sodium nitrate, potassium nitrate, calcium nitrate, magnesium nitrate, and mixtures thereof. Suitable buffer additives and methods are described in U.S. Pat. No. 5,622,920, incorporated herein by reference. A preferred buffer additive is a salt of an alkali metal, preferably an alkali metal carbonate, most preferably sodium carbonate.

In a preferred embodiment, the aqueous solution contains from about 0.2 wt % to about 1.5 wt % of the buffer additive, preferably sodium carbonate, most preferably from about 0.4 wt % to about 0.8 wt % of the buffer additive. Cuttings containing bitumen preferably are premixed with an amount of the buffer solution and for a time sufficient to activate the inactive natural surfactants in the bitumen. This typically requires: a bitumen to water ratio of about 10:90 to about 90:10, preferably from about 50:50 to about 85:15; a temperature during mixing of about 30° C.; and, low shear agitation (about 100 rpm), e.g. using a paddle mixer. Without limiting the invention to a particular theoretical basis, the following is believed to be the mechanism of activation of natural surfactant in bitumen:

1. $NaCO_3$ (aqueous)$\rightleftharpoons 2Na^+ + CO_3^-$
2. $CO_3^- + H_2O \rightleftharpoons HCO_3^- + OH^-$
3. Inactive surfactant (bitumen)+$OH^- \rightleftharpoons$ Active surfactant$^- + H_2O$.

Paraphrasing, the electrolyte is first ionized in water in (1). The carbonate is hydrolyzed to produce a buffer in (2). Then, molecules such as carboxylic acid that are present in the bitumen form natural surfactants adsorbed at the bitumen/water interface (3). The result is an electrostatic and steric stabilization of the bitumen droplets-in-water by the natural surfactant(s) present in the bitumen and the emulsifier blend.

The emulsifiers suitable for use when bitumen is present are non-ionic, anionic and non-ionic/anionic blend emulsifiers, where the non-ionic emulsifiers may be ethoxylated alcohols selected from the group consisting of polyethoxylated $C_{12}$–$C_{14}$ alcohols, saturated polyethoxylated $C_{16}$–$C_{18}$ alcohols, unsaturated polyethoxylated $C_{16}$–$C_{18}$ alcohols, and mixtures thereof, comprising from about 7 to about 20 moles, preferably from about 7 to about 10 moles of ethylene oxide. A preferred ethoxylated alcohol is isotridecyl alcohol with about 8.5 moles of ethylene oxide. A preferred anionic emulsifier is alkyl sulfate and sulfonate.

The following is a preferred emulsifying solution for use when bitumen is present.

| | |
|---|---|
| Sodium octyl sulfate | 8 wt. % |
| Isotridecyl ethoxylate with 7 moles of ethylene oxide | 21 wt. % |
| Isotridecyl ethoxylate with 10 moles of ethylene oxide | 21 wt. % |
| Isopropanol alcohol (IPA) | 5 wt. % |
| Water | 45 wt. % |

The oil/water ratio in the bitumen-containing cuttings should be from about 40/60 to about 20/80. The bitumen-containing cuttings and emulsifying solution are agitated in the lab with a paddle mixer at about 50 to about 200 rpm, which in the field equates to about 100 rpm, for from about 0.5 to about 5 minutes, preferably about 1.0 minute, until a stable emulsion of substantially all of the free hydrocarbons from the cuttings (including the bitumen) is formed. The emulsifier preferably travels to the bitumen/water interface without changing the size of the microscopic oil droplets formed during premixing with the buffer.

Thereafter, the encapsulating material is added. When sodium silicate is added to the solution, the sodium silicate becomes part of the continuous water phase. When phosphoric acid is added, an instantaneous acid-base reaction occurs between the reactive silicate and the acid, producing silica shells around the bitumen droplets. Waiting to add the phosphoric acid (or other non-toxic acid responsible for the acid-base reaction) until after premixing the bitumen with the buffer and adding the commercial emulsifier to the premixed buffer/bitumen solution prevents the phosphoric acid from destabilizing the bitumen-in-water emulsion.

The invention will be better understood with reference to the following examples, which are given for illustration only:

EXAMPLE 1

100 ml. of drilling mud containing a base oil of polyalphaolefin (SYN-TEQ®) was mixed with 125 ml. of emulsifier solution containing 5% of the emulsifier described in the Table below. The mixture was agitated at about 1200 rpm with a Prince-Castle mixer with a Fann B2710 blade. Measurements of the oil-droplet sizes were made after each minute of mixing up to 10 minutes. The results are given in the following Table:

| | Droplet size Vs Mixing time | | |
|---|---|---|---|
| Time, min | Isodecyl Alcohol Ethoxylate, 6 EO | Sodium Octyl Sulfate | (85/15) Isodecyl Alcohol Ethoxylate, 6 EO/Sodium Octyl Sulfate |
| 1 | 26.6 | 45.3 | 13.9 |
| 2 | 17.1 | 35.5 | 18.5 |
| 3 | 15.9 | 38.4 | 22.9 |
| 4 | 13.2 | 37.8 | 12.7 |
| 5 | 13.8 | 48.9 | 12.8 |
| 6 | 11.7 | 37.5 | 14.4 |
| 7 | 10.9 | 49 | 11.5 |
| 10 | 10.8 | 68 | 14.2 |

After 10 minutes of mixing, the emulsion sample was placed in a 100 ml. graduated cylinder where the emulsion volume change was measured as a function of time over a period of approximately 8 weeks. The results are given in the following Table:

| | | Emulsion Volume Decrease Vs Time | | |
|---|---|---|---|---|
| Time | LN (time) | Isodecyl Alcohol Ethoxylate, 6 EO | Sodium Octyl Sulfate | (85/15) Isodecyl Alcohol Ethoxylate, 6 EO/ Sodium Octyl Sulfate |
| 1 | 0 | 100 | | |
| 1200 | 7.0900768 | 89 | | |
| 1380 | 7.2298388 | 87 | | |
| 1605 | 7.380879 | 85 | | |
| 2520 | 7.8320142 | 77 | | |
| 3015 | 8.0113551 | 73 | | |
| 4350 | 8.3779311 | 63 | | |
| 18450 | 9.8228196 | 42 | | |
| 1 | 0 | | 100 | |
| 210 | 5.3471075 | | 88 | |
| 4800 | 8.4763712 | | 52 | |
| 6165 | 8.7266434 | | 50 | |
| 7200 | 8.8818363 | | 46.5 | |
| 8730 | 9.0745206 | | 42 | |
| 10290 | 9.2389278 | | 40 | |
| 14400 | 9.5749835 | | 36 | |
| 1 | 0 | | | 100 |
| 2580 | 7.8555447 | | | 95 |
| 4110 | 8.3211783 | | | 92 |
| 5670 | 8.6429444 | | | 90 |
| 9780 | 9.1880948 | | | 85 |

Although a small droplet size was seen using isodecyl alcohol ethoxylate (6 EO), the most stable emulsion with a sufficiently small average droplet size was (85/15) Isodecyl Alcohol Ethoxylate, 6 EO/Sodium Octyl Sulfate.

EXAMPLE 2

The procedures of Example 1 were repeated to determine the type of emulsifier that would result in the smallest average droplet size using an iso-paraffin base drilling fluid. The following were the results:

Droplet size Vs Mixing time

| Time, min | Isodecyl Alcohol Ethoxylate, 3 EO | Isodecyl Alcohol Ethoxylate, 10 EO | (50/50) Isodecyl Alcohol Ethoxylate, 3 EO/Isodecyl Alcohol Ethoxylate, 10 EO |
|---|---|---|---|
| 1 | 61.8 | 56.6 | 18 |
| 2 | 57.1 | 49.2 | 12.3 |
| 3 | 58.8 | 43.9 | 10.2 |
| 4 | 63.9 | 41.2 | 6.3 |
| 5 | 57.0 | 40.0 | 5.7 |
| 6 | 64.5 | 34.8 | 5.4 |
| 7 | 63.05 | 36.5 | 4.5 |
| 10 | 64.41 | 38.1 | 5.5 |

EXAMPLE 3

Screening experiments were performed to determine whether bitumen would best be emulsified using buffer solutions which activated the "natural surfactants" in the bitumen—such as sodium carbonate and sodium hydroxide—or using an amine, such as ethanolamine. The mean droplet particle size was measured using a Malvern Instruments Mastersizer the light scattering technique described in the Malvern Mastersizer Basic Manual, Reference Manual 0103, which has been incorporated herein by reference. The smallest mean droplet particle sizes obtained in these experiments were formed using natural surfactants—activated with sodium carbonate and sodium hydroxide.

EXAMPLE 4

Experiments were conducted to emulsify a bitumen containing sample and assess the mean particle sizes achieved using isotridecyl ethoxylate, alone, with various molar contents of ethylene oxide (7 moles EO and 10 moles EO), and blends of isotridecyl ethoxylates with and without IPA using buffer solutions (NaOH and $Na_2CO_3$). The following candidates were tested:

Ref. 1: Isotridecyl ethoxylate with 10 ethylene oxide;
Ref. 2: Isotridecyl ethoxylate with 7 ethylene oxide;
Ref. 3: Isotridecyl ethoxylate with 7 EO/Isotridecyl ethoxylate with 10 EO (50/50);
Ref. 4: Isotridecyl ethoxylate with 7 EO/Isotridecyl ethoxylate with 10 EO/ sodium octyl sulfate/IPA;
Ref. 5: Natural surfactants activated with Na2CO3;
Ref. 6: Natural surfactants activated with NaOH 50 ml. of bitumen was mixed with 50 ml. of emulsifier solution candidates given in the Table below. The mixture was agitated at about 1200 rpm with a Prince-Castle mixer with a Fann B2710 blade. Measurements of the oil-droplet sizes were made after each minute of mixing up to 10 minutes. The results are given in the following Table:

| Time, min | Ref. 1 | Ref. 2 | Ref. 3 | Ref. 4 | Ref. 5 | Ref. 6 |
|---|---|---|---|---|---|---|
| 1 | 17.7 |  | 18.6 | 17.29 | 1.7 | 6.7 |
| 2 | 17 | 26.9 | 17.6 | 15.91 | 2 | 3 |
| 3 |  | 25.9 |  | 16.25 | 1.05 | 1.67 |
| 4 | 19.6 | 25 | 17.3 |  |  | 2 |

-continued

| Time, min | Ref. 1 | Ref. 2 | Ref. 3 | Ref. 4 | Ref. 5 | Ref. 6 |
|---|---|---|---|---|---|---|
| 5 |  |  |  | 16.15 | 1.03 | 2.5 |
| 6 | 18.3 | 26.4 | 16.9 |  |  |  |
| 7 |  |  |  | 15.33 | 1.03 | 0.92 |
| 8 | 17.7 | 26.2 | 18.3 |  |  |  |
| 10 | 17 | 27.4 | 18.5 | 14.98 | 1.02 | 1.18 |

The smallest mean droplet size was achieved using the buffer solutions. The blend of [isotridecyl ethoxylate/7 moles EO] and the blend of [10 moles EO/IPA] performed better than the isotridecyl ethoxylates, alone, and the blends of isotridecyl ethoxylates with and without IPA.

EXAMPLE 5

Bitumen samples were: (a) mixed with buffer solution of 0.6% $Na_2CO_3$, (wt/wt) alone, for 10 minutes; (b) mixed the a blend of 0.6% $Na_2CO_3$ and surfactant Ref. 4 from Example 4 for 10 minutes; and, (c) premixed for three minutes with 0.6% $Na_2CO_3$, and then mixed with the surfactant Ref. 4 from Example 4 for an additional 7 minutes. Total mixing time for all samples was 10 minutes with a Prince Castle mixer at 1250 rpm. The results are given in the following Table:

| Time, min | NS activated with 0.6% Na2CO3 | NS activated with 0.6% Na2CO3 + Surfactant REF 4 after 3 min. mixing | NS activated with 0.6% Na2CO3 + Surfactant REF 4 |
|---|---|---|---|
| 1 | 1.7 | 1.31 | 17.29 |
| 2 | 2 | 1.03 | 15.91 |
| 3 | 1.05 | 1.01 | 16.25 |
| 4 |  | 0.95 |  |
| 5 | 1.03 |  | 16.15 |
| 6 |  |  |  |
| 7 | 1.03 | 0.98 | 15.33 |
| 8 |  |  |  |
| 10 | 1.02 | 0.97 | 14.98 |

The smallest droplet size was achieved with (c), premixing of the candidate for three minutes with 0.6% $Na_2CO_3$, and then mixing with the surfactant Ref. 4 from Example 4 for an additional 7 minutes.

Example 6

Shale cuttings contaminated with approximately 11 wt % bitumen were treated by mixing following in the following order:

| Mix: | 7 | 8 | 9 | 10 |
|---|---|---|---|---|
| Cuttings | 10 g | 10 g | 10 g | 10 g |
| Water with 0.6 wt % $Na_2CO_3$ (pH 11.2) | 1.31 g | 1.31 g | 2.04 g | 2.04 g |
| Sodium Silicate E | 0.51 g | 0.75 g | 0.51 g | 0.75 g |
| Phosphoric acid 85%/water 1/10 | 1 g | 1.5 g | 1 g | 1.5 g |

The oil/water ratio in the cuttings were as follows:

| Oil/water ratio | 46/54 | 46/54 | 35/65 | 35/65 |
|---|---|---|---|---|

All four samples exhibited good encapsulation properties and showed less than 0.001% oil on the cuttings.

Persons of ordinary skill in the art will appreciate that many modifications may be made to the embodiments described herein without departing from the spirit of the present invention. Accordingly, the embodiments described herein are illustrative only and are not intended to limit the scope of the present invention.

What is claimed is:

1. A method comprising:
   providing cuttings produced during drilling operations comprising a first quantity of free hydrocarbons comprising bitumen;
   mixing with said cuttings a buffer solution comprising a buffer agent effective to activate at least one natural surfactant in said bitumen, thereby converting said solution into an emulsion comprising bitumen droplets having a mean average particle size of about 20 microns or less;
   mixing with said emulsion an emulsifier effective to stabilize said emulsion; and
   thereafter adding to said emulsion an encapsulating material comprising an aqueous solution of a water-soluble silicate under conditions effective to form silica shells around said droplets.

2. The method of claim 1 wherein said mean average particle size is about 15 microns or less.

3. The method of claim 1 wherein said mean average particle size is about 10 microns or less.

4. The method of claim 1 wherein said mean average particle size is about 5 microns or less.

5. The method of claim 1 wherein said method is performed in situ.

6. The method of claim 2 wherein said method is performed in situ.

7. The method of claim 3 wherein said method is performed in situ.

8. The method of claim 4 wherein said method is performed in situ.

9. The method of claim 1 wherein said buffer agent is an alkali metal salt.

10. The method of claim 2 wherein said buffer agent is an alkali metal salt.

11. The method of claim 3 wherein said buffer agent is an alkali metal salt.

12. The method of claim 4 wherein said buffer agent is an alkali metal salt.

13. The method of claim 7 wherein said buffer agent is an alkali metal salt.

14. The method of claim 8 wherein said buffer agent is an alkali metal salt.

15. A method comprising:
   providing cuttings produced during drilling operations comprising a first quantity of free hydrocarbons comprising bitumen;
   mixing with said cuttings a buffer solution comprising a buffer agent effective to activate at least one natural surfactant in said bitumen, thereby converting said solution into an emulsion comprising bitumen droplets having a mean average particle size of about 2 microns or less;
   mixing with said emulsion an emulsifier effective to stabilize said emulsion; and
   thereafter adding to said emulsion an encapsulating material comprising an aqueous solution of a water-soluble silicate under conditions effective to form silica shells around said droplets.

16. The method of claim 15 wherein said method is performed in situ.

17. The method of claim 15 wherein said buffer agent is an alkali metal salt.

18. The method of claim 16 wherein said buffer agent is an alkali metal salt.

19. The method of claim 1 further comprising disposing of said cutting mixture via a method selected from the group consisting of discharging said cutting mixture in situ and incorporating said cutting mixture into concrete.

20. The method of claim 3 further comprising disposing of said cutting mixture via a method selected from the group consisting of discharging said cutting mixture in situ and incorporating said cutting mixture into concrete.

21. The method of claim 4 further comprising disposing of said cutting mixture via a method selected from the group consisting of discharging said cutting mixture in situ and incorporating said cutting mixture into concrete.

22. The method of claim 15 further comprising disposing of said cutting mixture via a method selected from the group consisting of discharging said cutting mixture in situ and incorporating said cutting mixture into concrete.

23. The method of claim 1 wherein said conditions comprise adding an acid effective to react with said silicate to form said silica shells.

24. The method of claim 4 wherein said conditions comprise adding an acid effective to react with said silicate to form said silica shells.

25. The method of claim 12 wherein said conditions comprise adding an acid effective to react with said silicate to form said silica shells.

26. The method of claim 14 wherein said conditions comprise adding an acid effective to react with said silicate to form said silica shells.

27. The method of claim 15 wherein said conditions comprise adding an acid effective to react with said silicate to form said silica shells.

* * * * *